(No Model.)
W. A. D. GRAHAM.
PNEUMATIC TIRE.
No. 592,138. Patented Oct. 19, 1897.
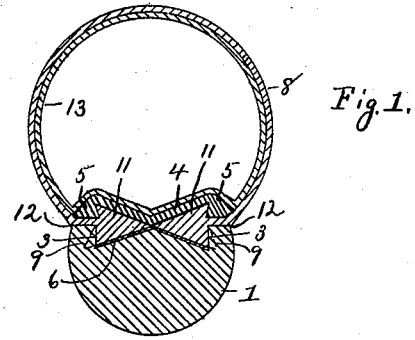
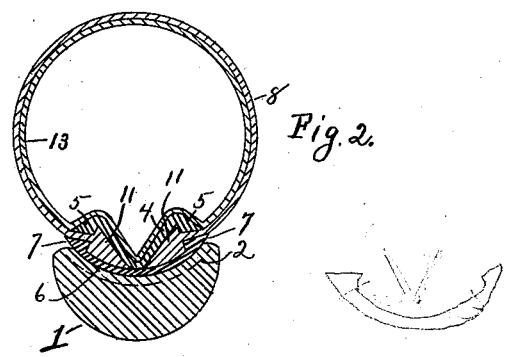
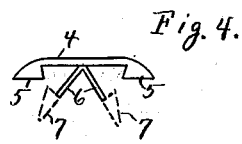
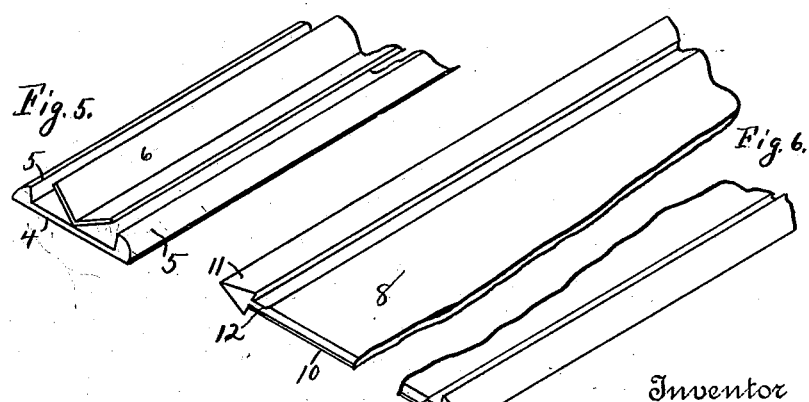
Witnesses
WM Chisholm
M. Cavanagh
Inventor
W. A. D. Graham
By Glascock & Co
Attorneys

UNITED STATES PATENT OFFICE.

WILLIAM A. D. GRAHAM, OF OWEN SOUND, CANADA.

PNEUMATIC TIRE.

SPECIFICATION forming part of Letters Patent No. 592,138, dated October 19, 1897.

Application filed March 28, 1896. Serial No. 585,257. (No model.)

*To all whom it may concern:*

Be it known that I, WILLIAM A. D. GRAHAM, a citizen of Canada, and a subject of the Queen of Great Britain, residing at Owen Sound, in the Province of Ontario and Dominion of Canada, have invented a certain new, useful, and valuable Improvement in Pneumatic Tires, of which the following is a full, clear, and exact description.

My invention has relation to pneumatic tires for wheels. It is especially adapted for bicycle-wheels.

It consists in the novel construction and arrangement of its parts, as hereinafter described.

In the accompanying drawings, Figure 1 is a transverse sectional view of the tire applied to a wheel-rim. Fig. 2 is a transverse sectional view showing a modification. Fig. 4 is an end view of the cover-locking means. Fig. 5 is a perspective view of the cover-locking means. Fig. 6 is a perspective view of the cover.

The rim 1 may be made of wood, or it may be made of metal, as indicated by the dotted line 2 in Fig. 2. The periphery of the rim is provided with suitable recesses 3 3, as shown in Fig. 1, or it may be concaved, as shown in Fig. 2, said recesses or concavity extending all the way around the rim.

The locking means or device consists of the flexible strip 4, having at each of its outer edges the abruptly-enlarged grips 5 5, the outer parts of the said grips tapering to an edge. To the under side of the strip 4, and along the middle of the same, is attached the flexible strip 6. The said strip 6 is attached to the strip 4 at an intermediate point, thus leaving the edges of the strip 6 free, as indicated in Fig. 4. The strip 6 may be of the same thickness through, as indicated by the heavy lines in Fig. 4, or the outer edges of the strip may be provided with the grips 7 7, as indicated by the dotted lines in Fig. 4 and the heavy lines in Fig. 2. The grips 7 7 are similar in construction to the grips 5 5. The enlargement of the grips 7 7 extend toward the grips 5 5, thus leaving between the two sets of grips a cavity adapted to receive the edges of the tire-cover 8.

The under side of the flexible strip 6 is secured by means of cement, glue, or other suitable means to the periphery of the wheel-rim 1, as shown in Figs. 1 and 2. Where the wheel-rim 1 is provided with the recesses 3 3, as shown in Fig. 1, the grips 7 7 are dispensed with, and the sides of the said recesses perform the function of the grips 7 7. The said sides may be perpendicular, as indicated by the heavy lines in Fig. 1, or they may be beveled, as indicated by the dotted lines 9 9 in Fig. 1.

The cover 8 consists of rubber or other flexible material. When rubber is used, it is preferable to line the inside of the cover with canvas or other non-elastic material, as shown at 10 in Fig. 6. The edges of the cover 8 are merged into the arrow-head shape enlargements 11 11, and said enlargements 11 11 are adapted to pass between the grips 5 5 and 7 7 and interlock therewith. The cover 8 is provided on its outer side and near each enlargement 11 with a line or depression 12. When the cover is in place on the rim, this line or depression 12 is in the immediate vicinity of the rim 1 or the grip 7, and thus indicating that the enlargements 11 and the two sets of grips are interlocked. (See Fig. 1.)

The air-tube 13 is located in the cover 8, and when said tube is inflated it firmly locks and holds the parts, as shown in Figs. 1 and 2. In order to remove the cover 8 from the wheel, it is simply necessary to exhaust the air from the tube 13, and the cover 8 and the tube 13 may be readily removed from the wheel.

Having described my invention, what I claim as new, and desire to secure by Letters Patent, is—

A pneumatic tire consisting of an air-tube, a detachable cover consisting of a flexible material, said cover having at each edge and on each side of the edge an enlargement, the rear edges of the enlargements forming plane surfaces and extending at an abrupt angle to the surfaces of the body portion of the cover, the forward portions of the enlargements being beveled and meeting at a common edge, a flexible strip having at both its edges protrusions the inner edge of said protrusions forming plane surfaces and extending at an abrupt angle to the body portion of said strip, said flexible strip being secured at an intermediate point to the intermediate point of the second strip, said second strip being secured to the periphery of the wheel-rim, suitable protrusions supported by the rim, said protrusions having at their inner edges plane surfaces extending at an abrupt angle to the surface of their supports, the last said gripping protrusions adapted to act in conjunction with the gripping protrusions on the first said strip in interlocking with the enlargements on the outer cover.

In testimony whereof I affix my signature in presence of two witnesses.

WILLIAM A. D. GRAHAM.

Witnesses:
W. N. CHISHOLM,
M. CAVANAGH.